(12) United States Patent
Joo et al.

(10) Patent No.: US 7,302,078 B2
(45) Date of Patent: Nov. 27, 2007

(54) APPARATUS AND METHOD FOR PREVENTING ILLEGAL DISTRIBUTION OF DIGITAL CONTENTS BY USING A FINGERPRINTING TECHNIQUE

(75) Inventors: Sanghyun Joo, Daejeon (KR); Won Gyum Kim, Daejeon (KR); Yong-Seok Seo, Daejeon (KR); Chang Soon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 828 days.

(21) Appl. No.: 10/648,517

(22) Filed: Aug. 27, 2003

(65) Prior Publication Data

US 2004/0156528 A1   Aug. 12, 2004

(30) Foreign Application Priority Data

Oct. 23, 2002   (KR) ............... 10-2002-0064922

(51) Int. Cl.
  *G06K 9/00* (2006.01)
  *G06K 15/00* (2006.01)
  *G09C 3/00* (2006.01)
  *H04L 9/00* (2006.01)

(52) U.S. Cl. ............. 382/100; 380/54; 713/176; 358/3.28

(58) Field of Classification Search ............ None
  See application file for complete search history.

(56) References Cited

U.S. PATENT DOCUMENTS 6,535,616 B1 * 3/2003 Hayashi et al. ............ 382/100

2003/0095682 A1 * 5/2003 Joo et al. ............ 382/100
2003/0099373 A1 * 5/2003 Joo et al. ............ 382/100

OTHER PUBLICATIONS

Birgit Pfitzmann, et al.;"*Anonymous Fingerprinting*"; Proceedings of Eurocrypt '97, LBCS, Springer-Verlag, Berlin 1997; pp. 1-15.

* cited by examiner

*Primary Examiner*—Bhavesh M Mehta
*Assistant Examiner*—Charles Kim
(74) *Attorney, Agent, or Firm*—Lowe Hauptman Ham & Berner LLP (57) ABSTRACT

An apparatus and method for preventing illegitimate distribution of digital contents on Internet obtains a first wavelet image having a user information-embedding region by performing a wavelet transformation (WT). The user information embedding region of the first wavelet image is wavelet-transformed to obtain a second wavelet image composed of a discrete cosine (DC) region and high-frequency regions second wavelet image. A high-frequency components removed image is obtained by removing high-frequency components in the high-frequency regions of the second wavelet image, and subjected to an inverse WT (IWT) to be outputted as an IWT image. A user information embedding unit embeds user information to the IWT image, wherein data of the user information are sequentially embedded to positions where a difference value between the user information embedding region and the new user information embedding region is small, to thereby reset the user information embedding region as the user information.

14 Claims, 4 Drawing Sheets

FIG. 4

APPARATUS AND METHOD FOR PREVENTING ILLEGAL DISTRIBUTION OF DIGITAL CONTENTS BY USING A FINGERPRINTING TECHNIQUE

FIELD OF THE INVENTION

The present invention relates to an apparatus and method for preventing illegal distribution of digital contents by using a fingerprinting technique; and, more particularly, to an apparatus and method for preventing illegitimate distribution of digital contents by using a fingerprinting technique which allows to embed purchaser information to the digital contents, sold through an electronic commercial activity, in the form of a watermark.

BACKGROUND OF THE INVENTION

In general, recent increase of illegitimate copying and purchase of digital contents through the use of Internet has intensified a demand for a technology capable of protecting intellectual property.

Unlike off-line contents, digital contents on the web can be easily copied and distributed all through the Internet. Thus, various technologies have been developed in order to protect intellectual property in the Internet environment. Among such technologies, there exist an encryption system, an access control system and a copyright marking system.

The encryption system and the access control system, however, are rarely utilized in recent years since they have a defect that contents can be illegally copied after being legally decoded.

On the other hand, the copyright marking system is gaining popularity since it employs a technique for directly embedding information to a media itself and, thus, can provide legal evidence in case a litigation for a literary piracy occurs, thereby contributing to finding out a copyright holder and an illegitimate distributor of contents.

More specifically, the copyright marking technology can be classified into a watermarking technique, a fingerprinting technique, etc.

The watermarking technique is used to prove only the property of contents by embedding information of an owner of the property to contents. Since, however, the same information, i.e., the owner information, is uniformly embedded to digital contents to be sold, all of the watermark embedded digital contents are undistinguishable from each other. For the reason, the watermarking technique is considered as a passive way to protect the property.

The fingerprinting technique, on the other hand, serves to find out a re-distributor of illegally copied contents by embedding information of a legitimate purchaser to the contents. Fingerprinted contents can be distinguished from each other since it is purchaser information, not property owner information, which is embedded to the digital contents. Therefore, the fingerprinting technique is a more active way of protecting intellectual property than the watermarking technique.

The fingerprinting technique involves three steps of generating, embedding and extracting user information by using an encryption protocol. The user information is embedded to contents by using a user key of a purchaser of the contents and the user key information is preserved in order to use later to trace a distributor of illegal copies of the contents.

Further, there is prepared a registration center (RC) between a seller and a purchaser, which takes charge of generating and embedding a user key, i.e., seller information, thereby allowing to obtain evidence of an illegal purchaser of illegally copied contents, if any.

However, the conventional technologies using the encryption protocol as described above have a defect in that digital contents can be illegally copied after being legally decoded and, further, a new user key can be generated by colluding user keys which have been respectively allotted to individual purchasers. Furthermore, since the fingerprinting technique using the encryption protocol is time-consuming in performing an embedding process due to its use of the encryption protocol, a quality of service (QOS) may be deteriorated in view of the fact that an e-purchase on the Internet should be processed on a real time basis.

In Eurocrypt97 (1997), there is disclosed a technology for preventing illegitimate distribution of contents by using such a conventional fingerprinting system, entitled "Anonymous Fingerprinting".

The anonymous fingerprinting is a fingerprinting technique using an encryption protocol. Purchaser information is attached to purchased contents. Thus, if the contents are illegally copied and distributed, a legitimate purchaser can be distinguished from illegitimate purchasers by extracting the purchaser information that has been embedded to the contents earlier.

To be more specific, a purchaser of certain contents registers his own purchaser information at a certified registration center. Then, the registered purchaser information is fingerprinted to the contents. A seller generates purchase information including the purchaser information registered at the registration center and, then, embeds to the sold contents the generated purchase information. Then, the seller distributes the purchase information embedded contents after encrypting the contents by using a user's key. If a redistributed content is founded, the seller extracts the embedded information from the redistributed content and sends the extracted information to the registration center to identify the legitimate purchaser of the contents.

In other words, the purchaser information serves as a single fingerprinting data to identify the purchaser. The purchaser information is embedded to contents when the contents are purchased. This system, however, does not specify where to embed the purchaser information but just suggests a simple transaction method between a seller and a purchaser, which uses an encryption technique.

Further, since multimedia data such as image and audio data is redistributed in a decoded state unlike general software, it is impossible to maintain the purchaser information as fingerprinting information. Therefore, another type of fingerprinting embedding and extraction technique is required in order to use the purchaser information as a fingerprinting data for the multimedia data such as image and audio data.

As described above, the prior-art technologies for protecting intellectual property exhibit drawbacks in that digital contents can be illegally copied after being legally decoded by making use of an encryption technique and, further, a new user key can be generated by colluding user keys already allotted to purchasers.

SUMMARY OF THE INVENTION

It is, therefore, an object of the present invention to provide an apparatus and method for preventing illegitimate redistribution of digital contents by employing a non-blind and a blind fingerprinting technique.

In accordance with one aspect of the invention, there is provided an apparatus for preventing illegitimate distribution of digital contents on Internet by employing a fingerprinting technique, including: a first wavelet image obtained by performing a wavelet transformation (WT) to an original image of the digital contents, wherein the first wavelet image has a user information embedding region; a second wavelet image obtained by performing a WT to the user information embedding region of the first wavelet image, wherein the second wavelet image composed of a discrete cosine (DC) region and high-frequency regions; a high-frequency components removed image composed of the DC region and regions obtained by removing high-frequency components in the high-frequency regions of the second wavelet image, i.e., by setting high-frequency components other than the DC as "0", and subjected to an inverse WT (IWT) to be outputted as an IWT image; and a user information embedding unit for embedding user information, which is provided from an operator, to the IWT image, thereby obtaining a user information embedded image with a new user information embedding region, comparing the user information embedding region of the first wavelet image with the new user information embedding region of the user information embedded image, and embedding the new user information to positions where a difference value between the user information embedding region and the new user information embedding region is small while minimizing a size change of the user information embedding region, to thereby reset the user information embedding region as the new user information.

In accordance with another aspect of the invention, there is provided a method for preventing illegitimate distribution of digital contents on Internet, including the steps of: performing a WT to an original image to obtain a first wavelet image; determining a user information embedding region in the first wavelet image and performing a WT to the user information embedding region, thereby obtaining a second wavelet image; removing high-frequency components from the second wavelet image by setting regions other than the user information embedding region of a discrete cosine (DC) as "0", thereby obtaining a high-frequency components removed image and performing an inverse WT (IWT) to the high-frequency components removed image, thereby obtaining an IWT image; embedding user information provided from an operator to the IWT image to obtain a user information embedded image, comparing a user information embedding region of the user information embedded image with the user information embedding region and resetting the user information embedding region as a new user information embedding region $LL_1$, which is determined by a length and an embedding intensity of a data sequence of the user information in order to minimize deterioration of image quality; and embedding the user information to a position where a difference value between the user information embedding region and the new user information embedding region is small.

In accordance with still another aspect of the invention, there is provided an apparatus digital contents on Internet by employing a fingerprinting technique, including: a first wavelet image obtained by performing a wavelet transformation (WT) to an original image of the digital contents, wherein the first wavelet image has a user information embedding region; a second wavelet image obtained by performing a WT to the user information embedding region of the first wavelet image, wherein the second wavelet image composed of a discrete cosine (DC) region and high-frequency regions; a high-frequency components removed image composed of the DC region and regions obtained by removing high-frequency components in the high-frequency regions of the second wavelet image, i.e., by setting high-frequency components other than the DC as "0", and subjected to an inverse WT (IWT) to be outputted as an IWT image; and a user information embedding unit for embedding user information, which is provided from an operator, to the IWT image, thereby obtaining a user information embedded image with a new user information embedding region, and embedding the new user information to a position determined by a random sequence generated from a location key in a blind information embedding system which does not use the first wavelet image, to thereby reset the user information embedding region as the new user information.

In accordance with still another aspect of the invention, there is provided a method for preventing illegitimate distribution of digital contents on Internet including the steps of: performing a WT to an original image to obtain a first wavelet image; determining a user information embedding region in the first wavelet image and performing a WT to the user information embedding region, thereby obtaining a second wavelet image; removing high-frequency components from the second wavelet image by setting regions other than the user information embedding region of a discrete cosine (DC) as "0", thereby obtaining a high-frequency components removed image and performing an inverse WT (IWT) to the high-frequency components removed image, thereby obtaining an IWT image; embedding user information and a location key provided from an operator to the IWT image to obtain a user information embedded image, thereby obtaining a user information embedded image with a new user information embedding region; and embedding the new user information to a position determined by a random sequence generated from a location key in a blind information embedding system which does not use the first wavelet image, to thereby reset the user information embedding region as the new user information.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
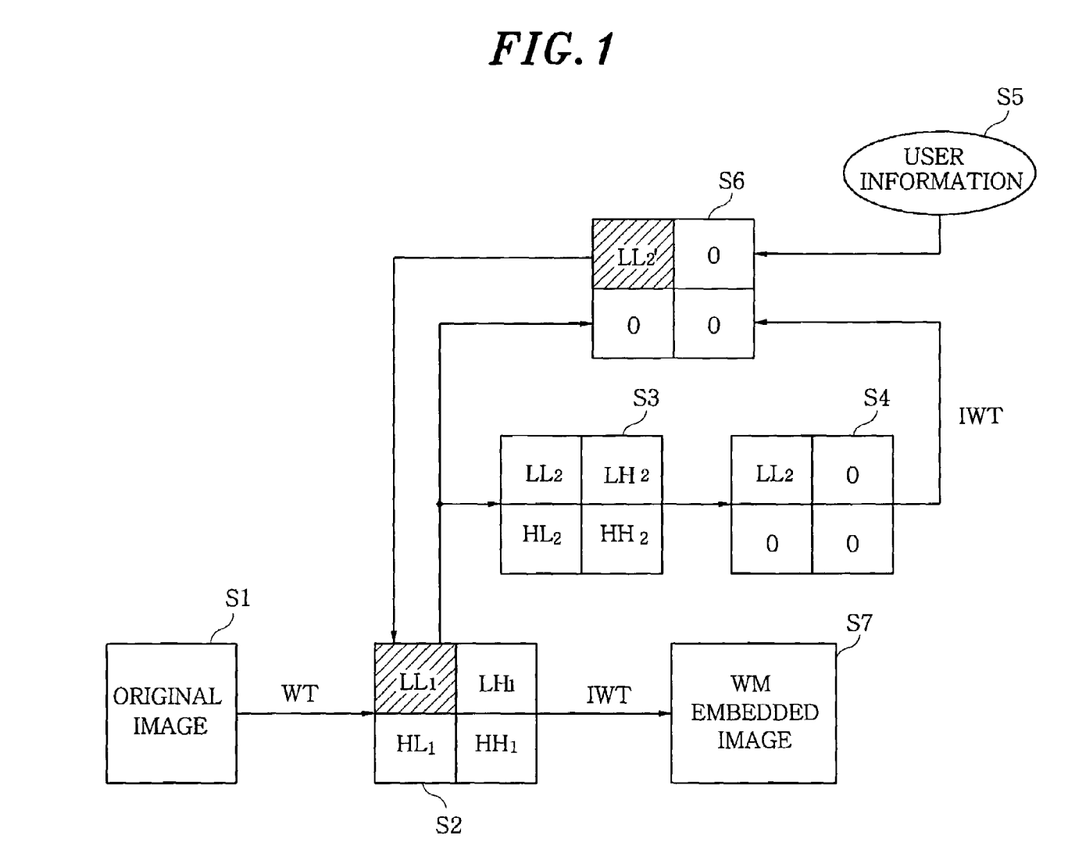
FIG. 1 shows a non-blind information embedding apparatus in accordance with the present invention.

Referring to FIG. 1, there is provided a non-blind information embedding apparatus in accordance with the present invention. After inputted to the non-blind information embedding apparatus, an original image S1 is subjected to a first-order wavelet transformation (WT) to be outputted as a first wavelet image S2. $LL_1$ of the first wavelet image S2 is set as a user information-embedding region and is subjected again to a first-order wavelet transformation (WT) to be outputted as a second wavelet image S3. Subsequently, high-frequency components are removed from the second wavelet image S3, i.e., regions other than the region $LL_1$ of a discrete cosine (DC) are all set to have a value of "0", thereby obtaining a high-frequency components removed image S4 composed of $LL_2$ serving as a DC region and $HL_2$, $LH_2$, and $HH_2$ respectively set to be "0". The high-frequency components removed image S4 is undergone through an inverse WT (IWT), thereby obtaining an IWT image S4' (not shown). Then, user information (UI) S5 provided from an operator (not shown) is embedded to the IWT image S4' to thereby generate a UI embedded image S6. The UI embedded image S6 has a new UI embedding region $LL_2'$. The new UI embedding region $LL_2'$ of the UI embedded image S6 is compared with $LL_1$ of the first wavelet image in size and $LL_1$ is reset as $LL_1'$ which is determined by a length and an embedding intensity of a data sequence of the UI S5 in order to minimize deterioration of image quality, $LL1'$ being located in a watermark embedded wavelet image S2' (not shown) corresponding to the first wavelet image S2.

At this time, the user information S5 is embedded to where the size difference between $LL_1$ and $LL_1'$ is small in order to minimize a size change of $LL_1$. To be more specific, values corresponding to $|LL_1-LL_1'|$ are arranged according to the order of size and data of the user information S5 are sequentially embedded to positions of the arranged values in a magnitude order, starting from where a difference value between $LL_1(p)$ and $LL_1'(p)$ is smallest, wherein $LL_1(p)$ represents a pth position of $LL_1$ and $LL_1'(p)$ refers to a pth position of $LL_1'$ corresponding to the pth position of $LL_1$. Thereafter, the watermark embedded wavelet image S2' is undergone through an inverse WT(IWT), thereby obtaining a watermark embedded image S7.

Figure 2:
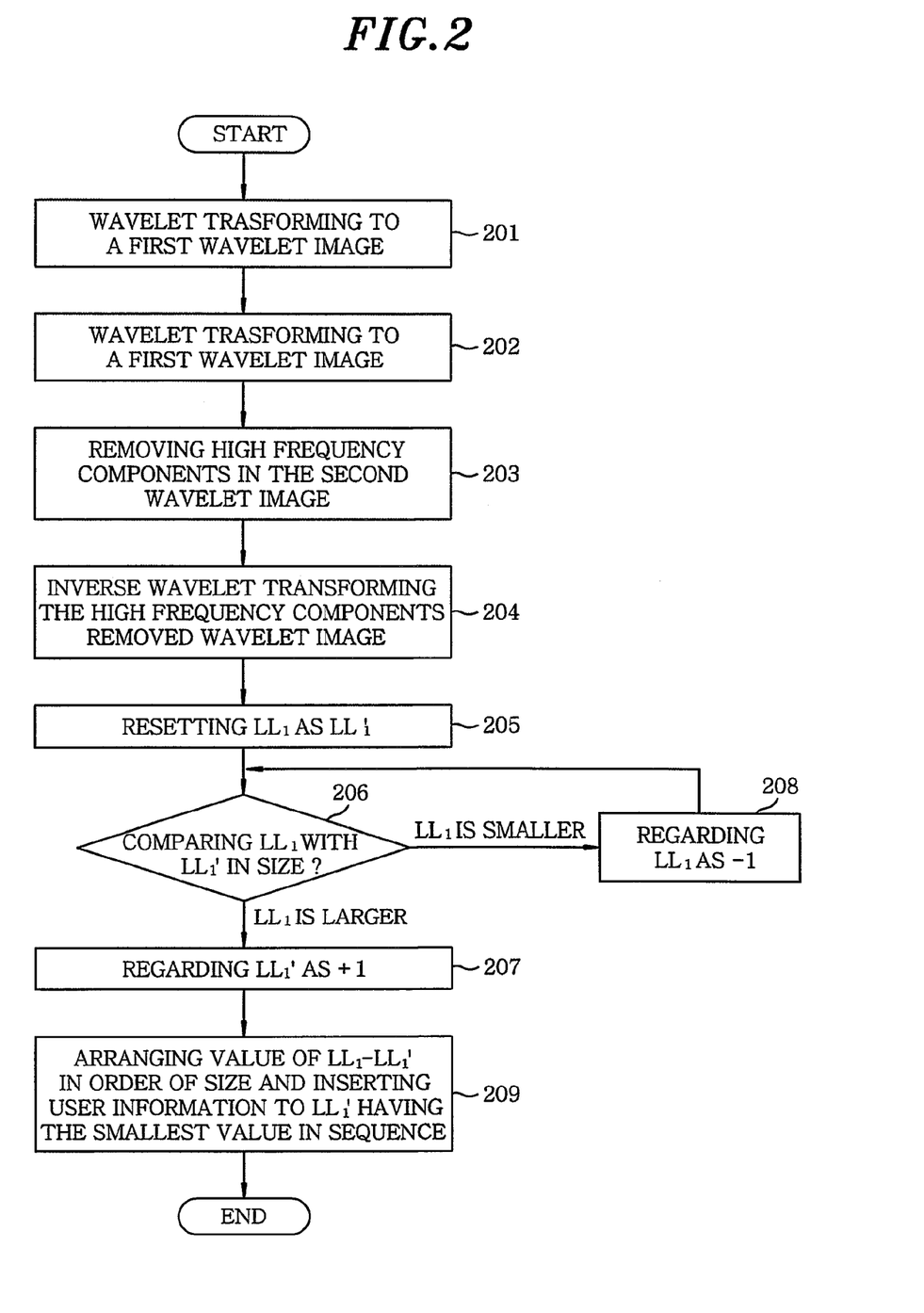
FIG. 2 is a flowchart describing operations of the non-blind information embedding apparatus in accordance with the present invention.

Referring to FIG. 2, there are described operations of the non-blind information embedding apparatus in accordance with the present invention.

First, an original image S1 is subjected to a first-order WT to be outputted as a first wavelet image S2 and user information S5 is embedded into a wavelet DC region $LL_1$ (Step 201). The order number of the wavelet transformation should be carefully selected since it determines the size of the DC region.

The DC region can include the largest amount of the user information S5 when it has a size equal to that of the original image S1. If an n-order WT is performed for an image having a size of M×N, the region $LL_1$ to which the user information S5 is to be embedded can be determined from the following Eq. 1.

$$\text{size}(LL_n) = \frac{M}{2^n} \times \frac{N}{2^n} \qquad \text{Eq. 1}$$

At this time, it is preferable that the size of the region $LL_1$ is determined by considering a length and an embedding intensity of the data sequence of the user information S5, and a degree of image deterioration due to the embedding of the user information S5 data sequence.

After the step 201 is completed, the user information embedding region $LL_1$ of the first wavelet image S2 is subjected to a first-order wavelet transformation(WT) again to be outputted as a second wavelet image S3 having sub bands of $LL_2$, $LH_2$, $HL_2$ and $HH_2$ (Step 202).

Thereafter, high-frequency components are removed from the second wavelet image S3 by setting regions other than the region $LL_1$ of a discrete cosine(DC) as "0", thereby obtaining a high-frequency components removed image S4 composed of $LL_2$ serving as a DC region and $LH_2$, $HL_2$ and $HH_2$, respectively set to be "0" (Step 203). The high-frequency components removed image S4 is undergone through an IWT, thereby obtaining an IWT image S4' (Step 204).

Subsequently, user information S5 provided from an operator is embedded to the IWT image S4', whereby a user information embedded image S6 is obtained. Then, a user information embedding region $LL_2'$ of the user information embedded image S6 is compared in size with the user information embedding region $LL_1$ in order to reset the $LL_1$ as $LL_1'$ which is determined by a length and an embedding intensity of a data sequence of the user information S5 in order to minimize deterioration of image quality (Step 205).

Positions of $LL_1'$ to which data of the user information S5 is embedded are determined by comparing components of $LL_1(p)$ and $LL_1'(p)$, wherein $LL_1(p)$ represents a PTH position of $LL_1$ and $LL_1'(p)$ refers to a pth position of $LL_1'$ (Step 206).

If a component of $LL_1(p)$ is larger than that of $LL_1'(p)$, $LL_1(p)$ is considered as +1 (Step 207) while if a component of $LL_1(p)$ is smaller than that of $LL_1'(p)$, $LL_1(P)$ is regarded as −1 (Step 208).

In other words, since $LL_1'$ is obtained from $LL_1$, the size of $LL_1$ should be properly adjusted to satisfy the binary of $LL_1$ information. At this time, it is notable that an enough distance K should be secured between $LL_i$ and $LL_i'$ because the value of a DC region, e.g., $LL_i$, can be changed by an arbitrary attack. The distance K is a variable that serves to determine the embedding intensity of the user information S5. The distance K should be set to have a proper value by considering the fact that if the distance value K is too big or is changed too often, the image quality may be greatly deteriorated.

As such, it is the most efficient way to embed the user information S5 to a position where a difference value between $LL_1(p)$ and $LL_1'(p)$ is found to be small since this way enables to minimize a size change of $LL_1$. Specifically, values corresponding to $|LL_1-LL_1'|$ are arranged according to the order of size and data of the user information S5 are sequentially embedded to positions of the arranged values in a magnitude order, starting from where a difference value between $LL_1(p)$ and $LL_1'(p)$ is smallest. By performing a series of user information embedding processes described above repeatedly (experiments shows, e.g., ten times is preferable), deterioration of image quality can be greatly reduced (Step 209).

Figure 3:
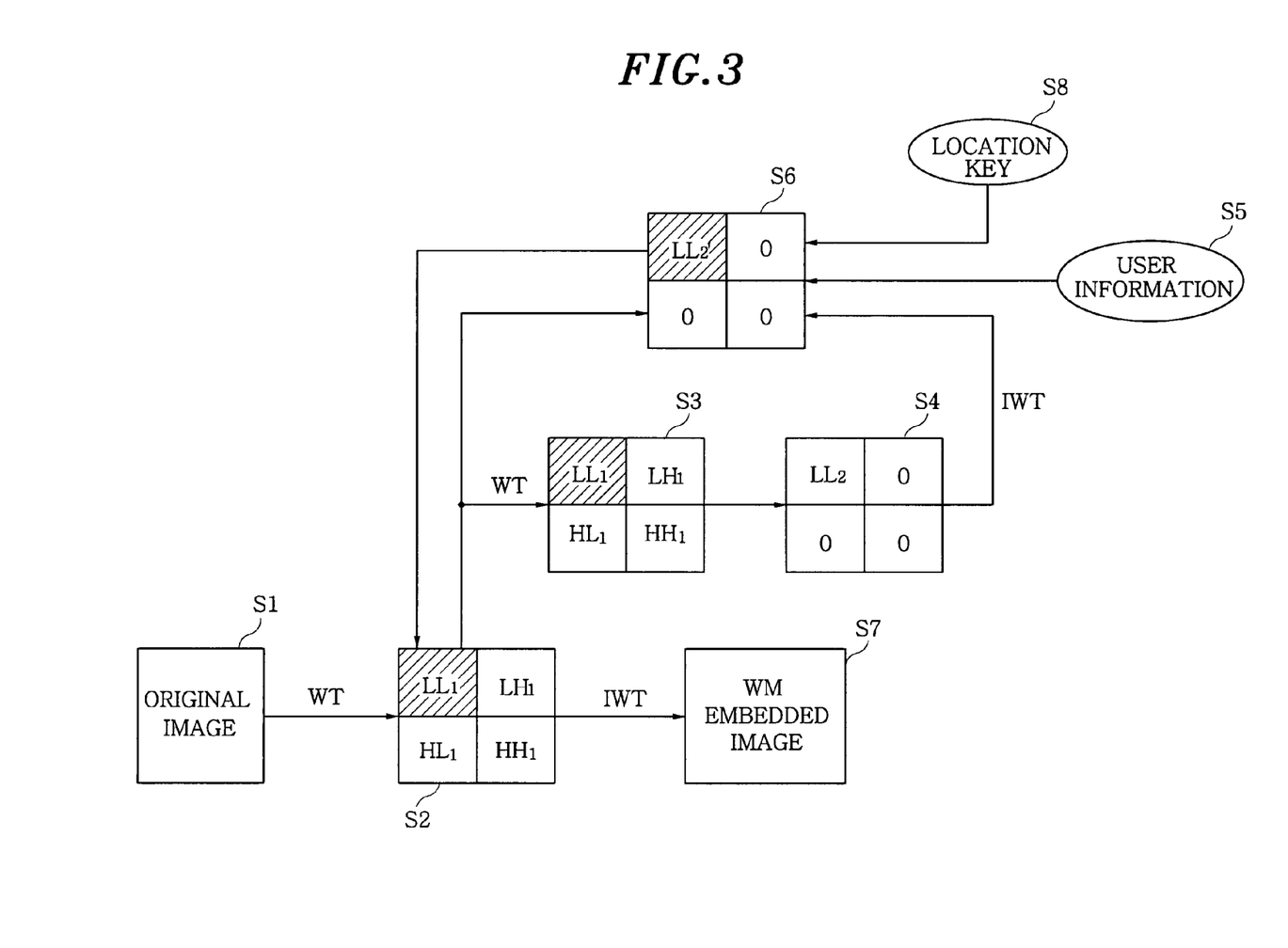
FIG. 3 illustrates a blind information embedding apparatus in accordance with the present invention.

Referring to FIG. 3, there is shown a blind information embedding apparatus in accordance with the present invention. An inputted original image is subjected to a first-order WT to be outputted as a first wavelet image S2. $LL_1$ of the first wavelet image S2 is set as a user information-embedding region and is subjected again to a first-order WT, thereby obtaining a second wavelet image S3. Subsequently, high-frequency components are removed from the second wavelet image S3, i.e., regions other than the region $LL_1$ of a discrete cosine (DC) are all set to have a value of "0", thereby obtaining a high-frequency components removed image S4 composed of $LL_2$ serving as a DC region and $HL_2$, $LH_2$ and $HH_2$ respectively set to be "0". The high-frequency components removed image S4 is subjected to an inverse Wt (IWT), thereby obtaining an IWT image S4' (not shown). Then, user information (UI) S5 and a location key S8 provided from an operator (not shown) are embedded to the IWT image S4', thereby generating a UI embedded image S6 having a new UI embedding region $LL_2'$. Thereafter, the new UI embedding region $LL_2'$ of the UI embedded image S6 is compared with $LL_1$ in size. $LL_1$ is reset as $LL_1'$, which is determined by a length and an embedding intensity of a data sequence of the user information in order to minimize deterioration of image quality, $LL_1'$ existing in a watermark embedded wavelet image S2' (not shown) corresponding to the first wavelet image S2.

In the meanwhile, since it is impossible to arrange the values $|LL_1-LL_1'|$ according to the size order in the blind information embedding apparatus which does not use the first wavelet image S2, the embedding positions of the user information S5 and the location key S8 are determined arbitrarily to minimize deterioration of the image quality. The wavelet image S2' in which a watermark is embedded through the user information embedding processes as described above is undergone through an IWT, thereby attaining a watermark embedded image S7.

Figure 4:
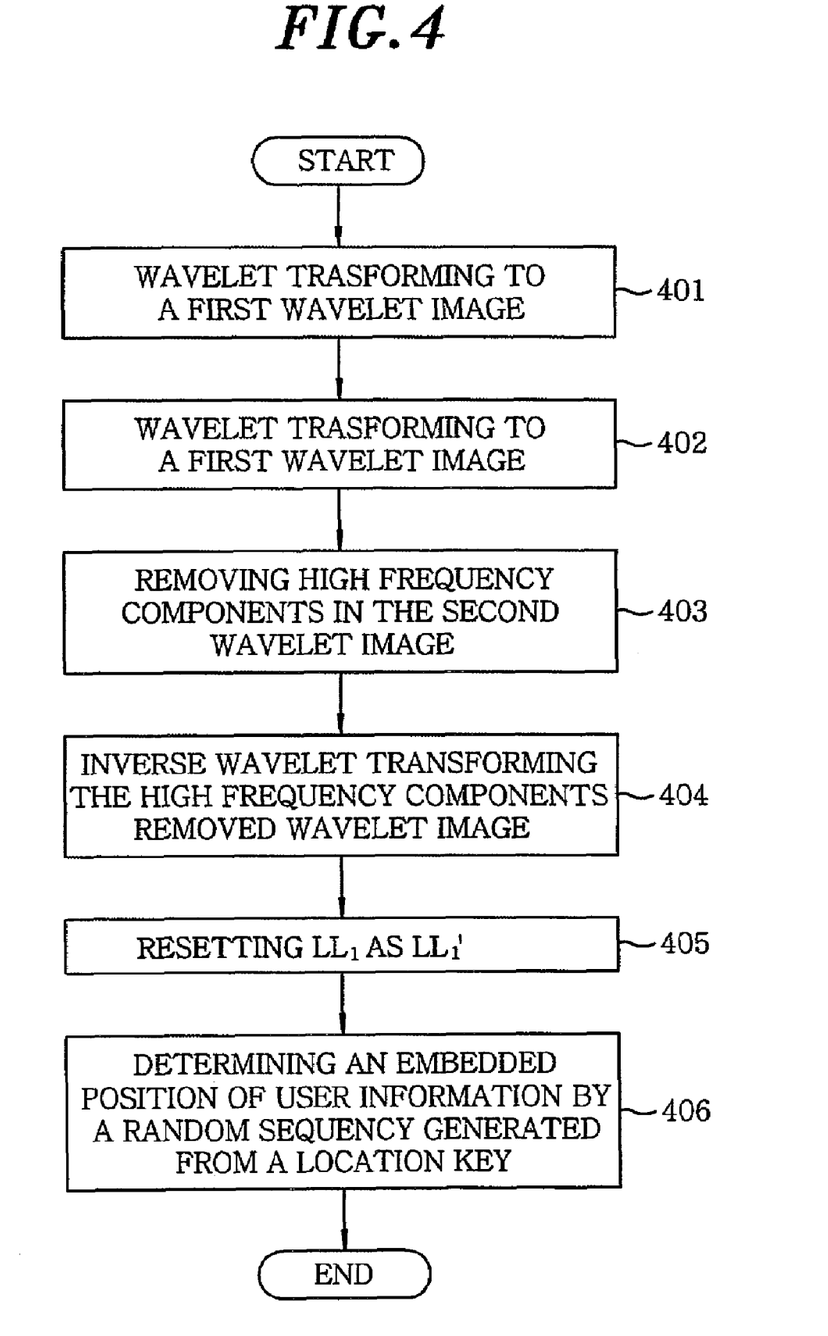
FIG. 4 offers a flowchart explaining operations of the blind information embedding apparatus in accordance with the present invention.

FIG. 4 shows a flowchart describing operations of the blind information embedding apparatus in accordance with the present invention.

First, an original image S1 is subjected to a first-order WT to be outputted as a first wavelet image S2 and user information S5 is embedded into a wavelet DC region $LL_1$ (Step 401). The order number of the wavelet transformation should be carefully selected since it determines the size of the DC region.

The DC region can accommodate the largest amount of the user information S5 when it has a size equal to that of the original image S1. If an n-order WT is performed for an image having a size of M×N, the region $LL_1$ to which the user information S5 is to be embedded can be determined from the Eq. 1 described above.

At this time, it is preferable that the size of the region $LL_1$ is determined by considering the length and the embedding intensity of the data sequence of the user information S5, and a degree of image deterioration due to the embedding of the user information S5 data sequence.

As described before, the user information embedding region $LL_1$ of the first wavelet image S2 is subjected to a first-order wavelet transformation (WT) again to be outputted as a second wavelet image S3 having sub bands of $LL_2$, $LH_2$, $HL_2$ and $HH_2$ (Step 402).

Thereafter, high-frequency components are removed from the second wavelet image S3 by setting regions other than the region $LL_1$ of DC as "0" (Step 403) and thus obtained high-frequency components removed image S4 composed of $LL_2$ serving as a DC region and $LH_2$, $HL_2$ and $HH_2$ respectively set to be "0" is subjected to an IWT (Step 404).

Afterwards, user information S5 and a location key provided from an operator are embedded to the IWT image S4', whereby a user information embedded image S6 is obtained. Then, a user information embedding region $LL_2'$ of the user information embedded image S6 is compared with the user information embedding region $LL_1$ in size in order to reset the $LL_1$ as $LL_1'$ which is newly determined by considering a length and an embedding intensity of the user information S5, which are found to be the most suitable for minimizing deterioration of image quality (Step 405).

Since it is impossible to arrange the values $|LL_1(12)-LL_1'|$ according to the size order in the blind information embedding system which does not use the first wavelet image S2, the embedding position of the user information S5 is determined by a random sequence generated from the location key S8 in order to minimize deterioration of the image quality (Step 406).

The random sequence $[locat(K) \in \{0,1\}, 1 \leq k \leq S(LL_n)]$ is set to have a probability defined in Eq. 2. The user information S5 is embedded to a position corresponding to "1" of the random sequence.

$$P(1) = ui\_len/S(LL_n)$$

$$P(0) = 1 - ui\_len/S(LL_n) \qquad \text{Eq. 2}$$

Herein, ui_len and $S(LL_n)$ respectively represent the size of $LL_n$ and the user information S5.

Provided in the following description are three experimental results for the blind fingerprinting technique in accordance with the present invention.

Experiment 1

16-byte (128-bit) information is embedded to Barbara and Lena's black-and-white picture having a size of 512×512 and the embedded information is extracted after a JPEG compression attack has been conducted thereto.

Conditions for the experiment 1 are as follows.
  User information S5: ETRI WaterMarks! 16 bytes
  Image quality (PSNR) after the embedding of the user information: 44.05 dB (finger_Barb)

Table 1 shows the result of extracting the embedded information after the JPEC compression attack is conducted at 46.45 dB (finger_Lena).

TABLE 1

| Image attack Objects | finger_Barb | finger_Lena |
|---|---|---|
| JPEG QF 10% | U>□催□□; □ | 低MSeq □□□u□ |
| JPEG QF 20% | dRTGe♥MrE(13)iY□ | 釆rB□!tm O□ + C□ |
| JPEG QF 30% | ]DRli□terM캠k! | □Rl Vat □□r□ |
| JPEG QF 40% | ETRI W!termarks % | □RI GAtermarks! |
| JPEG QF 50% | ETRI Watermarks! | ETRI Watermarks! |
| JPEG QF 60% | ETRI Watermarks! | ETRI Watermarks! |
| JPEG QF 70% | ETRI Watermarks! | ETRI Watermarks! |
| JPEG QF 80% | ETRI Watermarks! | ETRI Watermarks! |
| JPEG QF 90% | ETRI Watermarks! | ETRI Watermarks! |

Experiment 2

Different sets of user information are respectively embedded to the black-and-white picture of 512×512 and an averaging attack is conducted thereto. The result is shown in Table 2.

TABLE 2

| Key values for determining an embedding position | Embedded User Information (UI) | Image quality after the embedding of UI (PSNR) | Result Image |
|---|---|---|---|
| 3000 | joo sanghyun1632 | 46.14 dB | img1 |
| 3001 | kim jinho8606578 | 46.00 dB | img2 |
| 3002 | jang howook6694 | 45.55 dB | img3 |
| 3003 | moon kyungae5340 | 46.73 dB | img4 |
| 3004 | suh youngho6841 | 46.45 dB | img5 |

Experiment 3

A conspiracy trace is conducted based on correlativity with other images for the averaging attack. The results are provided in Tables 3 and 4.

TABLE 3

| | avg1 = (img1 + img2)/2 | decision |
|---|---|---|
| img1 | 0.7938 | Involved in conspiracy trace |
| img2 | 0.7584 | Involved in conspiracy trace |
| img3 | 0.0417 | |

TABLE 3-continued

| | avg1 = (img1 + img2)/2 | decision |
|---|---|---|
| img4 | −0.0161 | |
| img5 | −0.0236 | |

TABLE 4

| | Avg2 = (img1 + img2 + img3 + img4 + img5)/5 | decision |
|---|---|---|
| img1 | 0.4298 | Involved in conspiracy trace |
| img2 | 0.3665 | Involved in conspiracy trace |
| img3 | −0.0068 | |
| img4 | −0.0208 | |
| img5 | 0.4465 | Involved in conspiracy trace |

As described above, purchaser information is embedded to digital contents sold through electronic commercial activities by employing a non-blind fingerprinting and a blind fingerprinting technique and is extracted depending on allowance or disallowance of the use of an original image. Therefore, illegitimate copying and distribution of the digital contents can be prevented, so that property of the digital contents is effectively protected and safe and legitimate distribution thereof is secured. Further, since the system and method defined in the present invention are compatible with existing encryption systems or control systems using a specific browser and the system is designed to embed information, regardless of whether the information is the user information or any other kind of information related to a use control, to the digital contents in a predetermined input amount, it is possible to identify the owner of the contents and clarify where the responsibility lies even though an encryption of the contents is broken and the contents are illegally distributed. Accordingly, as this technology is known to the public more and more, legitimate distribution of the digital contents can be encouraged. Furthermore, the present technology can be applied, in addition to a stop image, to an audio/video system needing a real-time based embedding and detection. In particular, if the present invention is applied to a video system involving a large data amount, a greater amount of data can be embedded and, further, a meta data for managing the great amount of data need not be generated.

While the invention has been shown and described with respect to the preferred embodiments, it will be understood by those skilled in the art that various changes and modifications may be made without departing from the spirit and scope of the invention as defined in the following claims.

What is claimed is:

1. An apparatus for preventing illegitimate distribution of digital contents on Internet by employing a fingerprinting technique, comprising:
a first wavelet image obtained by performing a wavelet transformation (WT) to an original image of the digital contents, wherein the first wavelet image has a user information embedding region;
a second wavelet image obtained by performing a WT to the user information embedding region of the first wavelet image, wherein the second wavelet image is composed of a discrete cosine (DC) region and high-frequency regions;
a high-frequency components removed image composed of the DC region and regions obtained by removing high-frequency components in the high-frequency regions of the second wavelet image, i.e., by setting high-frequency components other than the DC as "0", and subjected to an inverse WT (IWT) to be outputted as an IWT image; and
a user information embedding unit for embedding user information, which is provided from an operator, to the IWT image, thereby obtaining a user information embedded image with a new user information embedding region, comparing the user information embedding region of the first wavelet image with the new user information embedding region of the user information embedded image, and embedding the user information to positions where a difference value between the user information embedding region and the new user information embedding region is small while minimizing a size change of the user information embedding region in the first wavelet image, to thereby reset the user information embedding region in the first wavelet image as the user information.

2. The apparatus of claim 1, wherein the new user information embedding region is determined by a length and an embedding intensity of a data sequence of the user information in order to minimize deterioration of image quality.

3. The apparatus of claim 1, wherein the user information embedding unit arranges difference values between the user information embedding region and the new user information embedding region according to the order of size and embeds the user information to positions of the arranged values in a magnitude order, starting from where a difference value between the user information embedding region and the new user information embedding region is smallest.

4. A method for preventing illegitimate distribution of digital contents on Internet comprising the steps of:
performing a WT to an original image to obtain a first wavelet image;
determining a user information embedding region in the first wavelet image and performing a WT to the user information embedding region, thereby obtaining a second wavelet image;
removing high-frequency components from the second wavelet image by setting regions other than the user information embedding region of a discrete cosine (DC) as "0", thereby obtaining a high-frequency components removed image and performing an inverse WT (IWT) to the high-frequency components removed image, thereby obtaining an IWT image;
embedding user information provided from an operator to the IWT image to obtain a user information embedded image, comparing a user information embedding region of the user information embedded image with the user information embedding region and resetting the user information embedding region in the first wavelet image as a new user information embedding region $LL_1$, which is determined by a length and an embedding intensity of a data sequence of the user information in order to minimize deterioration of image quality; and
embedding the user information to a position where a difference value between the user information embedding region and the new user information embedding region is small.

5. The method of claim 4, wherein an order number of the WT should be carefully selected since the user information is embedded to the DC region and the order number of the WT determines the size of the DC region.

6. The method of claim 4, wherein the DC region includes a largest amount of the user information if the DC region has a size equal to that of the original image and wherein if an n-order of WT is performed for an image having a size of M×N, a user information embedding region, LLn, to which the user information is to be embedded is determined from an equation as follows:

$$\text{size}(LL_n) = \frac{M}{2^n} \times \frac{N}{2^n}.$$

7. The method of claim 6, wherein the size of the DC region is determined by considering a length and an embedding intensity of the data sequence of the user information and a degree of image deterioration due to the embedding of the user information data sequence.

8. The method of claim 4, wherein the new user information embedding region is obtained by low pass filtering the user information embedding region in the first wavelet image.

9. The method of claim 4, wherein positions of the new user information embedding region are determined by comparing a component of the user information embedding region in the first wavelet image and that of the new user information embedding region referring to the component of user information embedding region.

10. The method of claim 9, wherein if a component of the user information embedding region in the first wavelet image is larger than that of the new user information embedding region, the user information embedding region in the first wavelet image is considered as +1 while if a component of the user information embedding region in the first wavelet image is smaller than that of the new user information embedding region, the user information embedding region in the first wavelet image is regarded as −1.

11. The method of claim 10, wherein the size of the user information embedding region in the first wavelet image should be properly adjusted to satisfy the binary information because the new user information embedding region is obtained from the user information embedding region in the first wavelet image.

12. The method of claim 10, wherein an enough distance K should be secured between a user information embedding region and a new user information embedding region because the value of the user information embedding region in the first wavelet image can be changed by an arbitrary attack, wherein the new user information embedding region is a DC region.

13. The method of claim 12, wherein the distance K is a variable that serves to determine the embedding intensity of the user information and wherein the distance K should be set to have a proper value by considering the fact that the image quality may be deteriorated if the distance value K is too big or too small.

14. The method of claim 12, wherein difference values between the user information embedding region in the first wavelet image and the new user information embedding region are arranged according to the order of size and data of the user information are sequentially embedded to positions of the arranged values in a magnitude order, starting from the smallest value; and wherein deterioration of image quality is greatly reduced by repeatedly performing a series of user information embedding processes as described above.

* * * * *